Figure 1:
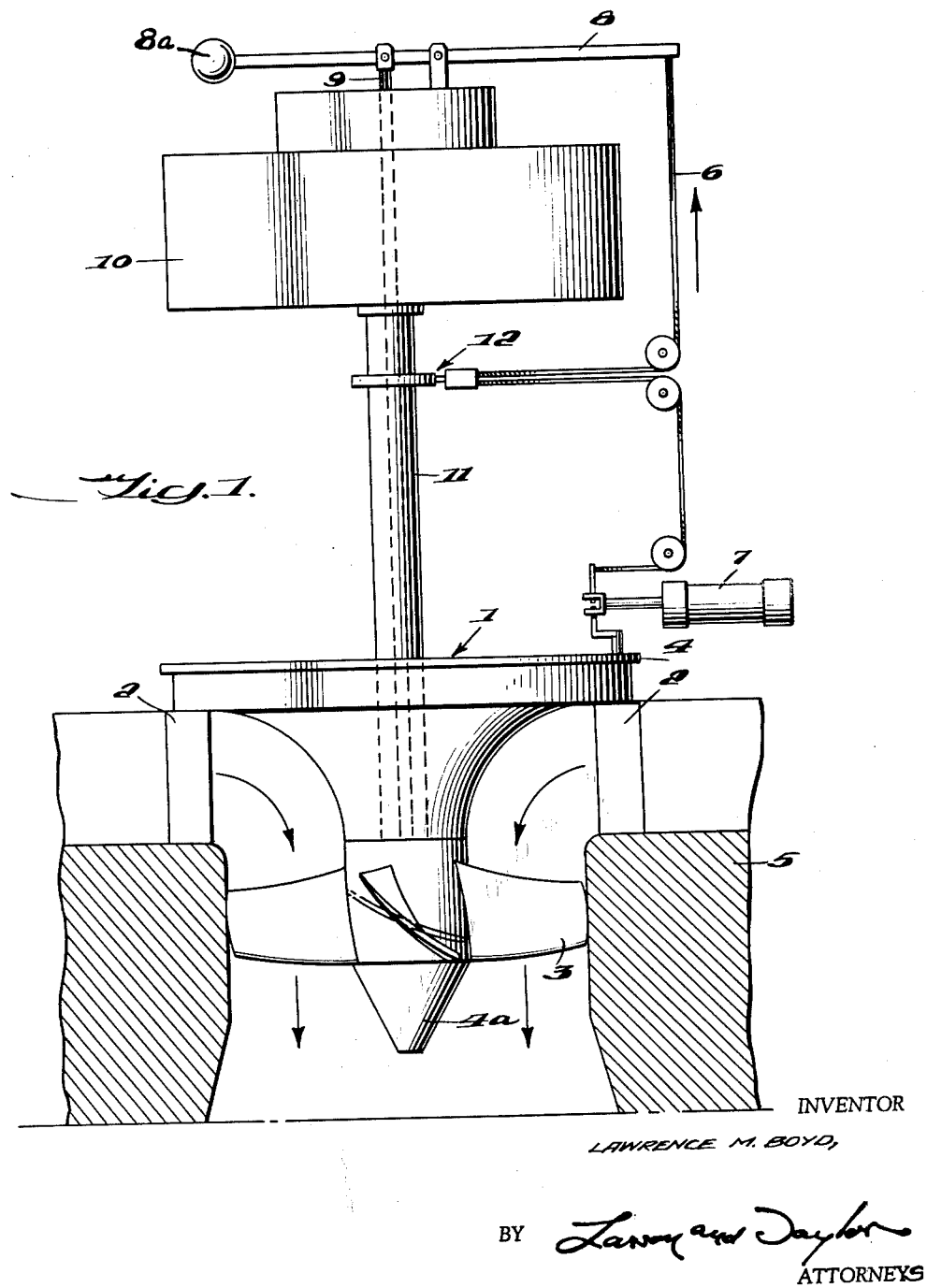

July 14, 1964  L. M. BOYD  3,140,854
SPEED LIMITING DEVICE FOR TURBINES
Filed Oct. 31, 1961  2 Sheets-Sheet 2

INVENTOR
LAWRENCE M. BOYD,
BY Lawry and Taylor
ATTORNEYS

United States Patent Office 3,140,854
Patented July 14, 1964

3,140,854
SPEED LIMITING DEVICE FOR TURBINES
Lawrence M. Boyd, Senneville, Quebec, Canada, assignor to Dominion Engineering Works Limited, Montreal, Quebec, Canada
Filed Oct. 31, 1961, Ser. No. 148,927
5 Claims. (Cl. 253—31)

This invention relates to a speed limiting device for a turbine and more particularly to a mechanism for preventing a turbine from reaching runaway speed upon simultaneous dropping of the load of the turbine and failure of the power controlling system.

In application Serial No. 108,814 filed May 9, 1961, for "Basic Pipeless Runner Blade Servo System for Turbines," there is disclosed a means for controlling the position of runner blades in accordance with the setting of the wicket gates. According to the above referred to patent application the control system for the runner blades is disposed within a rotating assembly including the casing structure serving as a hub for mounting the runner blades. The advantages of such an improved system in eliminating the piping and rotary seals of conventional Kaplan turbines are adequately brought out in the aforementioned patent application.

There is, however, a problem in connection with the operation of Kaplan type turbines which is not solved by the runner blade servo system disclosed in the above mentioned patent application. Upon decrease of the power demand upon the turbine and simultaneous failure of the power controlling system, the turbine speed will increase to runaway speed. According to the present invention means is provided for reducing the overspeed of the turbine to a relatively small increase over synchronous speed when the power controlling system malfunctions or fails.

It has been found that when the power demand on a turbine is reduced the speed of the turbine may be limited by shifting the runner blades from fine to coarse pitch. There have been methods and mechanisms proposed for shifting the runner blades into coarse position but such means have heretofore involved electrical circuitry or modification of the runner blade servo system, hence involving substantial increase in cost of the system. According to the present invention a speed control means is provided for a Kaplan type turbine which will function to shift the runner blades from fine to coarse position upon increase in the speed of the turbine over synchronous speed. According to the present invention a mechanism is provided which will actuate the control cable interconnecting the wicket gate servo system with the control valve for the runner blade servo system. Upon increase in the speed of the turbine over synchronous speed the presently disclosed mechanism will actuate the control cable to shift the runner blade servo system valve to cause the runner blades to be moved to coarse position. The mechanism is simple to install and is very reliable.

An object of the present invention is to provide a speed limiting device for a Kaplan type turbine in which the runner blades are moved to coarse pitch when the turbine speed increases over synchronous speed.

Another object of the present invention is to provide a speed control system for a Kaplan type turbine wherein the runner blade servo system is disposed within the rotating assembly and in which the speed control system actuates the control cable interconnecting the wicket gate servo system and the control valve for the runner blade servo system.

Figure 2:
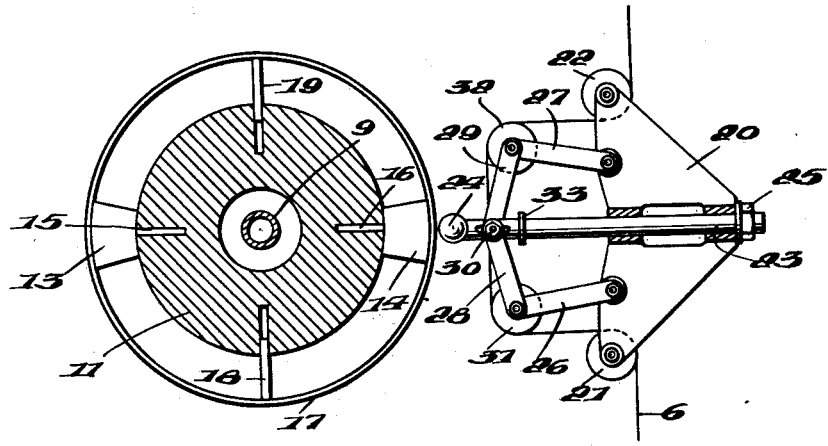
Figure 3:
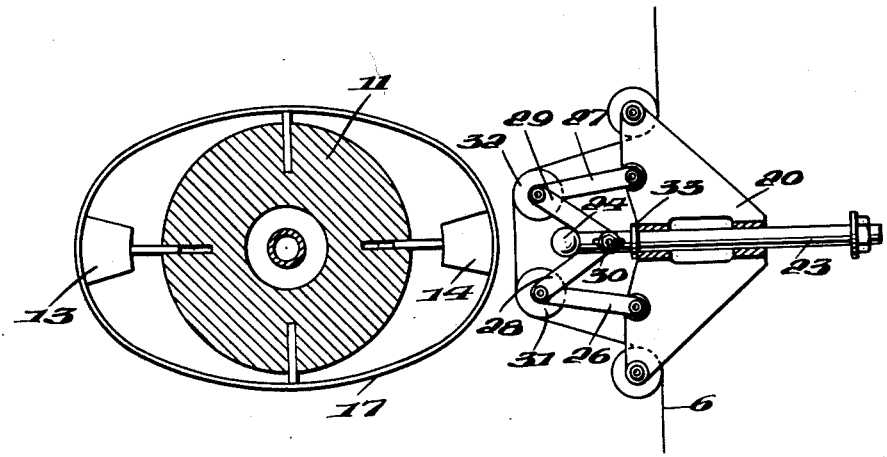

Other objects and many of the attendant advantages of the present invention will become apparent upon consideration of the following detailed specification in connection with the accompanying drawings wherein:

FIG. 1 is an elevational view partly in section showing a turbine and generator with a speed limiting device according to the present invention, FIG. 2 is a plan view partly in section of the speed limiting device with the parts in the normal operating position and, FIG. 3 is a view similar to FIG. 2 showing the parts when actuated by overspeed of the turbine.

Referring now more specifically to the drawings wherein like numerals indicate like parts throughout the several views there is shown at 1 in FIG. 1 a turbine assembly including wicket gates 2 and runner blades 3. The wicket gates are mounted in a stationary housing structure including a top plate 4 and casing portion 5. The runner blades 3 are journalled in a hub 4a and the runner blades are positioned at predetermined angles in accordance with the setting of the wicket gates 2 which is, in turn, determined by the power demand on the generator.

The mechanism for actuating the runner blades in response to the position setting of the wicket gates is housed within the rotating assembly and may be identical with the system disclosed in application Serial No. 108,814 filed May 9, 1961. This system includes a control cable 6 extending from the wicket gate servo control cylinder 7 to the pivoted control lever 8 at the upper end of the assembly. The pivoted control lever 8 has mounted thereon a counterweight 8a and a control rod 9 which extends downwardly through the generator 10 and the rotating shaft 11 of the turbine to the control valve of the runner blade servo system. Shifting of the angular position of the wicket gates 2 will actuate the cable 6 to cause the control rod 9 to be raised or lowered which will in turn reposition the control valve of the runner blade servo system, thus setting the angular position of the runner blades.

The presently disclosed speed limiting device is shown in FIG. 1 at 12 and provides a means whereby upon overspeed of the turbine shaft 11, the control cable 6 will be elongated so as to lower the control rod 9. This movement of the control rod serves to position the runner blade servo system control valve to shift the runner blades from fine to coarse position. Thus, the turbine is prevented from reaching runaway speed upon decrease of the power requirements of the generator 10.

In FIG. 2 the turbine shaft is shown in section at 11 and the control rod 9 extends centrally through the turbine shaft. A pair of weights 13 and 14 have rod-like extensions 15 and 16 respectively which extend into radial bores in the turbine shaft 11. The weights are retained in the position shown in FIG. 2 by means of a circular spring 17 which is supported by projections 18 and 19 slidably disposed in radial bores in the shaft 11.

Disposed adjacent the circular spring 17 is a frame 20 having pulleys 21 and 22 journalled thereon. A rod 23 is slidable in the frame 20 and has a tappet 24 mounted on one end thereof and a stop nut 25 mounted on the other end thereof. There is provided a linkage system including links 26 and 27 pivoted on the frame 20 and links 28 and 29 which are pivoted to the free ends of links 26 and 27, respectively. The other ends of links 28 and 29 are pivoted on the slidable rod 23 as at 30. Pulleys 31 and 32 are journalled at the points of connection of links 26 and 28 and 27 and 29, respectively. The cable 6 passes over pulleys 21, 31, 32, and 22 in the manner shown as it extends from the hydraulic servo motor 7 to the control lever 8. The linkage is so arranged that when the parts are in the normal operating position as shown in FIG. 2 tension on the control cable 6 will not alter the position of the parts and the control lever 8 will respond to movements of the servo system 7 in the usual manner.

When the turbine shaft speed increases to greater than synchronous speed and there is danger of the turbine reaching runaway speed, it is desirable to actuate the runner blade servo system to move the runner blades to coarse position irrespective of the wicket gate setting. When the turbine speed increases due to sudden decrease in the load on the generator, the centrifugal weights 13 and 14 will move outwardly as shown in FIG. 3. When the weights move outwardly the circular spring 17 contacts the tappet 24 thereby forcing the slidable rod 23 away from shaft 11. It can be appreciated that tension in the control cable 6 causes compressive loads on the linkage 26, 27, 28, 29 so that when the tappet 24 is moved away from shaft 11 by the outward radial movement of the weights 13 and 14, the apex 30 of the collapsible linkage moves over center and the tension in cable 6 causes the linkage to collapse, forcing the rod 23 to its end position determined by stop 33. The collapse of the linkage permits the pulleys 31 and 32 to be closer to each other than they were with the linkage in the normal position shown in FIG. 2. Thus, the control cable 6 becomes, in effect, lengthened. The end of control lever 8 to which the cable 6 is attached is made free to move upward under the influence of counterweight 8a and by the weight of the runner blade control valve assembly and thus the runner blade control valve is moved downwardly to cause movement of the runner blades to the coarse position.

Obviously, many modifications and variations of the present invention are possible in light of the above teachings.

What is claimed as new and desired to be secured by Letters Patent is:

1. A Kaplan type turbine including an output shaft, adjustable wicket gates, adjustable runner blades, a power controlling system for changing the angular positioning of the wicket gates and runner blades in response to variations of the power demand upon the turbine, said controlling system including a wicket gate adjusting mechanism operatively connected to the wicket gates for changing the angular position thereof, a runner blade adjusting mechanism operatively connected to the runner blades for changing the angular position thereof, a normally shortened but lengthwise extensible connecting means interconnecting the wicket gate adjusting mechanism and the runner blade adjusting mechanism and serving, in its normally shortened condition, to effect operation of the runner blade adjusting mechanism in response to operation of the wicket gate adjusting mechanism and emergency speed limiting means functioning automatically, in response to a decrease of the power demand upon the turbine and simultaneous failure of said power control system, to effect operation of the runner blade adjusting mechanism to move the runner blades, independently of the wicket gate adjusting mechanism, to a coarse pitch or fully open position to thereby limit overspeeding of the turbine to a relatively small increase over synchronous speed, said emergency speed limiting means including speed responsive connecting means interconnecting said output shaft and said extensible connecting means and serving to effect operation of the runner blade adjusting mechanism by lengthwise extension of said extensible connecting means to thereby move the runner blades to a coarse pitch or fully open position independently of said wicket gate adjusting mechanism and in response to a relatively small increase in the speed of the turbine over synchronous speed.

2. A Kaplan type turbine as set forth in claim 1, in which the said speed responsive means interconnecting the output shaft and the extensible connecting means comprises centrifugal weights mounted on the turbine shaft and cooperative means mounted on said extensible connecting means and functioning in response to outward movement of the centrifugal weight means to effect the aforesaid lengthwise extension of said extensible connecting means.

3. A turbine as set forth in claim 2, in which the extensible connecting means comprises a cable and the means mounted on said extensible connecting means and cooperating with said centrifugal weight means comprises a collapsible linkage normally holding the extensible connecting means in its shortened condition but adapted to be collapsed by outward movement of the cooperating centrifugal weight means to effect the aforesaid lengthwise extension of said extensible connecting means.

4. A Kaplan turbine comprising adjustable runner blades, adjustable wicket gates, means for angularly adjusting said runner blades in response to movement of said wicket gates, said last named means including a normally shortened but lengthwise extensible control cable, a turbine shaft, centrifugal weights mounted on said shaft for slidable movement radially of said shaft, circular spring means normally retaining said weights in engagement with said shaft, a collapsible linkage in engagement with said control cable, a slidable rod pivoted on said collapsible linkage and having an end portion disposed in adjacency with said centrifugal weights whereby at normal speeds the weights are inoperative to actuate the slidable rod and the position of the runner blades is determined solely by the angular adjusting means and upon overspeed of the turbine the weights move radially outwardly to act against the slidable rod to collapse the linkage and effect lengthwise extension of the control cable to angularly adjust the position of the runner blades.

5. A Kaplan turbine according to claim 4 wherein said collapsible linkage includes two pairs of pivoted links having one end of each pair connected to a frame and the other end of each pair connected to said slidable rod, pulleys journalled at the connected point of the links of each pair, the control cable passing over said pulleys.

References Cited in the file of this patent
UNITED STATES PATENTS

| 2,115,890 | Thoma | May 3, 1938 |
| 2,840,344 | Stage | June 24, 1958 |
| 2,986,646 | Ding | May 30, 1961 |

FOREIGN PATENTS

| 332,958 | Switzerland | Nov. 15, 1958 |